(12) United States Patent
Todhunter

(10) Patent No.: US 11,130,261 B2
(45) Date of Patent: Sep. 28, 2021

(54) STEERABLE HEAT SOURCE

(71) Applicant: THE BOEING COMPANY, Chicago, IL (US)

(72) Inventor: Christian Aaron Todhunter, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 294 days.

(21) Appl. No.: 16/368,098

(22) Filed: Mar. 28, 2019

(65) Prior Publication Data

US 2020/0307035 A1 Oct. 1, 2020

(51) Int. Cl.
*B29C 35/02* (2006.01)

(52) U.S. Cl.
CPC ...... *B29C 35/0227* (2013.01); *B29C 35/0288* (2013.01)

(58) Field of Classification Search
CPC .................. B29C 35/0227; B29C 35/0288
See application file for complete search history.

(56) References Cited

U.S. PATENT DOCUMENTS

| | | | |
|---|---|---|---|
| 4,018,566 A * | 4/1977 | Zeuch ................ | C30B 13/00 117/201 |
| 4,828,472 A * | 5/1989 | Itoh .................. | B29C 33/02 264/40.5 |
| 5,900,060 A * | 5/1999 | Nause ................ | C30B 15/00 117/223 |
| 6,872,918 B2 | 3/2005 | Toll | |
| 8,142,707 B2 | 3/2012 | Stacey et al. | |
| 2008/0175753 A1* | 7/2008 | Clothier ............. | F27B 17/00 422/26 |
| 2009/0011063 A1* | 1/2009 | Davie ................ | B29C 33/02 425/144 |
| 2018/0194040 A1* | 7/2018 | Barnes .............. | B29C 35/0227 |

* cited by examiner

*Primary Examiner* — James P Mackey
(74) *Attorney, Agent, or Firm* — Moore Intellectual Property Law, PLLC

(57) ABSTRACT

An apparatus includes a pressure vessel and a steerable heat source disposed within the pressure vessel. The apparatus also includes one or more control systems coupled to the steerable heat source. The one or more control systems are configured to direct supplemental heat toward a targeted region within the pressure vessel using the steerable heat source.

20 Claims, 6 Drawing Sheets

STEERABLE HEAT SOURCE

FIELD OF THE DISCLOSURE

The present disclosure is related to a steerable heat source for use in an autoclave.

BACKGROUND

Autoclaves are designed to expose a workpiece (e.g., an article disposed within an autoclave) to high-temperature at a controlled pressure (which can be high-pressure or low-pressure). Autoclaves are used for a variety of purposes. For example, an autoclave can be used in a manufacturing process to provide a controlled environment for curing polymers or for other heat treatment processes. To illustrate, some composite materials can be cured in an autoclave.

One challenge with using an autoclave in manufacturing is providing a desired temperature at all points within a pressure vessel of the autoclave. For example, some processes performed in an autoclave may specify that a uniform temperature (e.g., no temperature gradient) be maintained within the pressure vessel. However, it can be challenging to maintain a uniform temperature in a large autoclave or when the workpiece itself absorbs or generates heat unevenly. For example, if the workpiece is disposed in the autoclave to cure a polymer and the curing process for the polymer is an exothermic reaction, then thicker or denser portions of the workpiece may tend to generate more heat than thinner or less dense portions of the workpiece. As a result, a non-uniform temperature distribution can occur in the autoclave. As another example, the shape of the workpiece or the positioning of the workpiece in the autoclave can cause uneven heating of the workpiece. To illustrate, a portion of the workpiece can be shielded from a heat source of the autoclave by another portion of the workpiece or by a support member or other feature of the autoclave. Non-uniform temperatures within the autoclave and/or uneven heating of the workpiece can result in differential thermal expansion of the workpiece or differential curing of the workpiece, either of which can damage the workpiece. Additionally, non-uniform temperatures within the autoclave can result in increased cycle times. For example, lower temperature zones within the autoclave can result in increased cycle times for heating the workpiece.

SUMMARY

According to one implementation of the present disclosure, an apparatus includes a pressure vessel and a steerable heat source disposed within the pressure vessel. The apparatus also includes one or more control systems coupled to the steerable heat source. The one or more control systems are configured to direct supplemental heat toward a targeted region within the pressure vessel using the steerable heat source.

According to another implementation of the present disclosure, a method of heat and pressure treating an article of manufacture includes regulating a pressure level in a pressure vessel. The method also includes regulating an environment in the pressure vessel. The method further includes directing heat towards (or onto) a targeted region within the pressure vessel using a steerable heat source.

According to another implementation of the present disclosure, an apparatus includes a pressure vessel having an interior that is configured to receive an article of manufacture. The apparatus also includes a wide-area heat source disposed within the pressure vessel and a steerable heat source disposed within the pressure vessel. The apparatus also includes a compressor coupled to the pressure vessel. The apparatus further includes one or more control systems coupled to the wide-area heat source, to the steerable heat source, and to the pump. Based on a cure recipe associated with the article of manufacture, the one or more control systems is configured to regulate a temperature of the interior of the pressure vessel using the wide-area heat source, direct supplemental heat toward a targeted region within the pressure vessel using the steerable heat source, and regulate a pressure level of the interior of the pressure vessel using the compressor.

One advantage of the above-described implementations is improved control of a temperature distribution within an autoclave. Improving the control of the temperature distribution within the autoclave can also improve a cycle time for curing an article of manufacture within the autoclave. Additionally, the features, functions, and advantages that have been described can be achieved independently in various implementations or may be combined in yet other implementations, further details of which are disclosed with reference to the following description and drawings.

DETAILED DESCRIPTION

Figure 1:
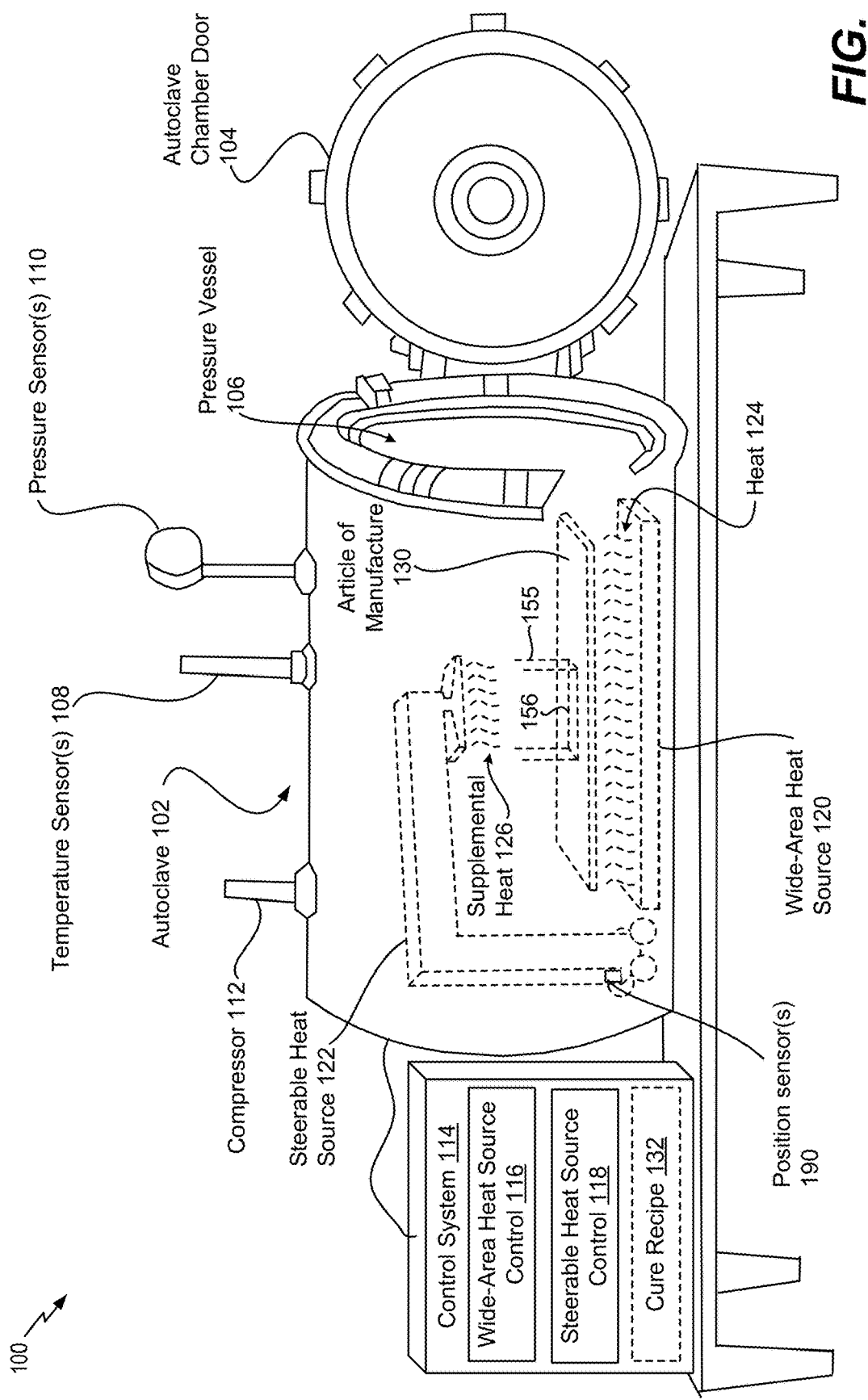
FIG. 1 is a diagram of an example of a system that is operable to direct supplemental heat toward a targeted region within a pressure vessel of an autoclave.

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 4, multiple light sources are illustrated and associated with reference numbers 422A, 422B, etc. When referring to a particular one of these light sources, such as the light source 422A, the distinguishing letter "A" is used. However, when referring to any arbitrary one of these light sources or to these light sources as a group, the reference number 422 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

The techniques described herein enable directing supplemental heat to targeted regions within a pressure vessel using a steerable heat source. Using the supplemental heat can help improve control of a temperature distribution within the pressure vessel, e.g., to reduce thermal expansions experienced by an article of manufacture in the pressure vessel, to control a curing rate of different portions of the article of manufacture, etc. For example, a control system can use temperature sensors to detect cooler regions on the article of manufacture that is undergoing a curing process in the pressure vessel. Based on the detected cooler regions, the control system can move the steerable heat source towards the cooler regions to provide supplemental heat to the cooler regions. In some implementations, as described below with respect to FIG. 5, a fixed, supplemental, zonal, and grid-controllable heat source can be used to provide direct supplemental heat to targeted regions within the pressure vessel. The fixed, supplemental, zonal, and grid-controllable heat source can be in lieu of, or in addition to, the steerable heat source.

FIG. 1 is an illustration of a system 100 that is operable to direct supplemental heat toward a targeted region within a pressure vessel of an autoclave. The system 100 includes an autoclave 102. The autoclave 102 is an apparatus that is operable to carry out industrial processes using elevated temperature and using pressure that is different from ambient air pressure.

Figure 5:
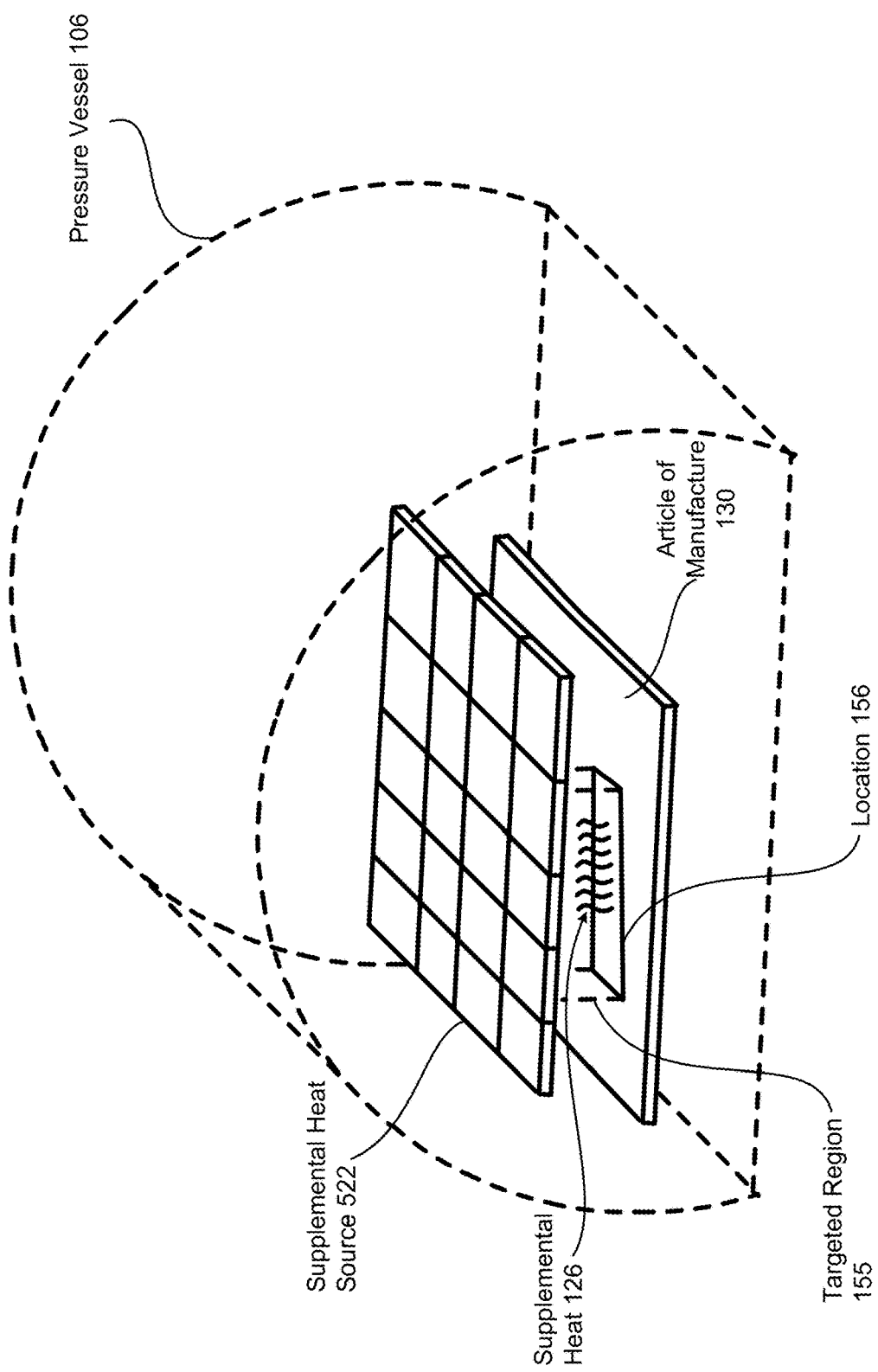
FIG. 5 is another diagram of a pressure vessel that includes a fixed, supplemental, zonal, and grid-controllable heat source that is operable to direct supplemental heat toward a targeted region.

The autoclave 102 includes a pressure vessel 106 and a wide-area heat source 120 disposed within the pressure vessel 106. The wide-area heat source 120 is configured to generate or distribute heat 124 inside the pressure vessel 106. According to one implementation, the wide-area heat source 120 includes one or more resistive heating elements. For example, the wide-area heat source 120 can include embedded heating elements, carbon nanotubes, ceramics, etc. According to another implementation, the wide-area heat source 120 includes electric cartridge heaters. Thus, the wide-area heat source 120 is configured to provide substantially uniform heat throughout the pressure vessel 106 to carryout different processes; however, as explained above, non-uniform heating can nevertheless occur due to presence of a workpiece (e.g., an article of manufacture 130) in the pressure vessel 106. It should be noted that in some implementations, the pressure vessel 106 does not include the wide-area heat source 120 and heat is solely generated using a steerable heat source 122 or a fixed, supplemental, zonal, grid-controllable heat source, as illustrated in FIG. 5. Thus, in implementations where the pressure vessel is a "pressure-only" vessel, the wide-area heat source 120 can be excluded from the pressure vessel 106.

The steerable heat source 122 is also disposed within the pressure vessel 106. The steerable heat source 122 is configured to generate supplemental heat 126 (e.g., heat that is in addition to the heat 124 generated by the wide-area heat source 120) inside the pressure vessel 106. For example, the steerable heat source 122 can direct the supplemental heat 126 toward a targeted region 155 within the pressure vessel 106. As a result, the targeted region 155 receives the supplemental heat 126 in addition to the heat 124 generated by the wide-area heat source 120. According to one implementation, the steerable heat source 122 includes a light-based heat source. As non-limiting examples, the steerable heat source 122 can include a laser, an infrared radiation device, a conductive heat device, an inductive heat device, a resistive heat device, etc. According to another implementation, the steerable heat source 122 includes a plurality of light sources arranged in a pattern, as described with respect to FIG. 4. For example, a subset of the plurality of light sources proximate to the targeted region 155 can be activated to provide the supplemental heat 126 to the targeted region 155.

One or more control systems, illustrated as a control system 114, are coupled to the wide-area heat source 120 and to the steerable heat source 122. The control system 114 is configured to regulate a temperature of an interior of the pressure vessel 106 using the wide-area heat source 120. For example, the control system 114 includes a wide-area heat source control 116. One or more temperature sensors 108 of the autoclave 102 can detect the temperature of the interior of the pressure vessel 106 and can provide a temperature signal (indicating the temperature) to the wide-area heat source control 116. Based on the temperature signal, the wide-area heat source control 116 can regulate (e.g., increase or decrease) the temperature of the interior of the pressure vessel 106 using the wide-area heat source 120. To illustrate, if the temperature signal indicates that the temperature of the interior of the pressure vessel 106 is two-hundred four (204) degrees Celsius and a target temperature for the interior of the pressure vessel 106 is three-hundred (300) degrees Celsius, the wide-area heat source control 116 can generate a command to increase heat output by the wide-area heat source 120 to increase the temperature of the interior of the pressure vessel 106. Alternatively, if the temperature signal indicates that the temperature of the interior of the pressure vessel 106 is three-hundred forty (340) degrees Celsius and the target temperature for the interior of the pressure vessel 106 is three-hundred (300) degrees Celsius, the wide-area heat source control 116 can generate a command to decrease heat output by the wide-area heat source 120 to decrease the temperature of the interior of the pressure vessel 106. Although illustrated as a "fixed heat source," according to one implementation, the wide-area heat source 120 can be a "steerable" heat source. For example, a location of the wide-area heat source 120 can be controlled via a grid toggling through the control system 114.

The control system 114 is also configured to direct the supplemental heat 126 towards the targeted region 155 within the pressure vessel 106 using the steerable heat source 122. For example, the control system 114 includes a steerable heat source control 118. One or more of the temperature sensor(s) 108 within the pressure vessel 106 can detect a temperature of the targeted region 155 and can provide a temperature signal (indicating the temperature of the targeted region 155) to the steerable heat source control 118. Based on the temperature signal, the steerable heat source control 118 can control the location and heat output of the steerable heat source 122 to direct the supplemental heat 126 toward the targeted region 155.

The interior of the pressure vessel 106 is configured (e.g., sized and shaped) to receive the article of manufacture 130. The article of manufacture 130 can include any equipment or supplies that are subject to an autoclave treatment. As a non-limiting example, the article of manufacture 130 can include a composite structure that is to be cured in the autoclave 102. To illustrate, the composite structure can include a component of an aircraft, a watercraft, a land craft, or other another system that is being assembled or manufactured.

A cure recipe 132 associated with the article of manufacture 130 is provided to the control system 114. The cure recipe 132 is a set of instructions that is executable by the control system 114 to control parameters of the pressure vessel 106 during processing of the article of manufacture 130. For example, the cure recipe 132 can indicate a target temperature of the interior of the pressure vessel 106, a target pressure of the interior of the pressure vessel 106, etc. In some implementations, the cure recipe 132 can identify the targeted region 155 that is to receive the supplemental heat 126, timing of application of the supplemental heat 126, a target temperature of the target region 155, etc. In some implementations, the cure recipe 132 can identify multiple targeted regions 155 that are to receive supplemental heat 126 concurrently or sequentially.

Based on the cure recipe 132 associated with the article of manufacture 130, the control system 114 regulates the temperature of the interior of the pressure vessel 106 and regulates a pressure of the interior of the pressure vessel 106. As described above, the wide-area heat source control 116 of the control system 114 can regulate (e.g., increase or decrease) the temperature of the interior of the pressure vessel 106 using the wide-area heat source 120. For example, if the cure recipe 132 indicates that the target temperature for the interior of the pressure vessel 106 is three-hundred (300) degrees Celsius and the current temperature of the interior of the pressure vessel 106 is two-hundred four (204) degrees Celsius, the wide-area heat source control 116 can generate a command to increase heat output by the wide-area heat source 120 to increase the temperature of the interior of the pressure vessel 106.

To regulate the pressure of the interior of the pressure vessel 106, the control system 114 can receive a pressure reading from one or more pressure sensors 110 within the autoclave 102. The pressure sensor(s) 110 indicates a pressure level of the interior of the pressure vessel 106 or a pressure difference between the interior of the pressure vessel 106 and an ambient environment outside the pressure vessel 106. If the cure recipe 132 indicates that a target pressure for the interior of the pressure vessel 106 is fifteen (15) pounds per square inch (psi) and the pressure sensor(s) 110 indicates that the pressure level of the interior of the pressure vessel 106 is thirteen (13) psi, the control system 114 can regulate (e.g., increase) the pressure level of the interior of the pressure vessel 106 using a compressor 112 coupled to the pressure vessel 106. For example, the control system 114 can generate a command to activate the compressor 112 to increase the pressure level of the interior of the pressure vessel 106. According to one implementation, compressor 112 includes a pump.

According to one implementation, the cure recipe 132 specifies a location 156 on the article of manufacture 130 to provide the supplemental heat 126. In some implementations, the cure recipe 132 specifies an allowable temperature distribution across the article of manufacture 130, and the location 156 is dynamically selected, by the control system 114, based on temperature data from the temperature sensor(s) 108 and the allowable temperature distribution. The control system 114 is configured to control the steerable heat source 122 based on the cure recipe 132. For example, the control system 114 can identify the targeted region 155 within the pressure vessel 106 that corresponds to the location 156 on the article of manufacture 130. The targeted region 155 can be identified based on area parameters of the article of manufacture 130 defined by the cure recipe 132 and a location of the article of manufacture 130 within the pressure vessel 106. For example, the cure recipe 132 can indicate a length of the article of manufacture 130, a width of the article of manufacture 130, a shape of the article of manufacture 130, etc. In other implementations, different area parameters such as a circumference of the article of manufacture 130, a radius of the article of manufacture 130, etc. can be indicated by the cure recipe 132. Based on the area parameters and the location of the article of manufacture 130 with the pressure vessel 106, the control system 114 can identify the target region 155 that corresponds to the location 156 on the article of manufacture 130. The control system 114 can also determine the location and/or orientation of the steerable heat source 122 (e.g., based on data from one or more position sensors 190 associated with the steerable heat source 122) within the pressure vessel 106 and can generate a command to steer the steerable heat source 122 toward the targeted region 155 to provide the supplemental heat 126 at the location 156 on the article of manufacture 130.

According to one implementation, the cure recipe 132 specifies a temperature distribution for the article of manufacture 130. For example, the cure recipe 132 can indicate that the article of manufacture 130 should have a uniform substrate temperature of three-hundred (300) degrees Celsius. The control system 114 can detect (based on temperature data from the temperature sensor(s) 108) a non-uniform temperature distribution of the article of manufacture 130. For example, a particular temperature sensor of the temperature sensor(s) 108 can indicate that the location 156 on the article of manufacture 130 has a temperature of two-hundred seventy-five (275) degrees Celsius and the other areas on the article of manufacture 130 have a temperature of three-hundred (300) degrees Celsius. Based on the detected non-uniform temperature distribution of the article of manufacture 130, the control system 114 can steer the steerable heat source 122 to the target region 155 to provide the supplemental heat 126 to the location 156 on the article of manufacture 130. In another example, the cure recipe 132 can specify a non-uniform temperature distribution of the article of manufacture 130. To illustrate, the cure recipe 132 can indicate that the location 156 of the article of manufacture 130 is to be processed at a higher temperature than other portions of the article of manufacture.

The system 100 of FIG. 1 enables directing the supplemental heat 126 to specified portions (e.g., the location 156) of the article of manufacture 130 to facilitate heating control across composite panels (e.g., the article of manufacture 130) while curing inside the autoclave 102. For example, based on the cure recipe 132, the control system 114 can identify at least one location 156 on the article of manufacture 130 that is to be provided supplemental heat 126 in addition to the heat 124 provided by the wide-area heat source 120. In response to identifying the location 156, the control system 114 can steer the steerable heat source 122 to provide the supplemental heat 126 at the location 156 on the article of manufacture 130. Providing the supplemental heat 126 at the targeted location 156 can reduce the cycle time for curing the article of manufacture 130. Additionally, articles of manufacture 130 having complex (e.g., non-uniform) heating requirements can be cured by applying the supplemental heat 126 to designated sections.

Additionally, the system 100 can reduce thermal expansion differences across the article of manufacture 130 that results from temperature differentials experienced by different portions of the article of manufacture 130. For example, the control system 114 can use temperature data from the temperature sensor(s) 108 to identify locations, such as the location 156, on the article of manufacture 130 that are cooler than other locations. In response to identifying the cooler locations, the control system 114 can steer the steerable heat source 122 towards the cooler locations (based on position feedback information from the position sensor(s) 190) to provide the supplemental heat 126. As a result, process induces stresses in the article of manufacture 130 (e.g., due to different curing rates or differential thermal expansion) can be substantially reduced.

Figure 2:
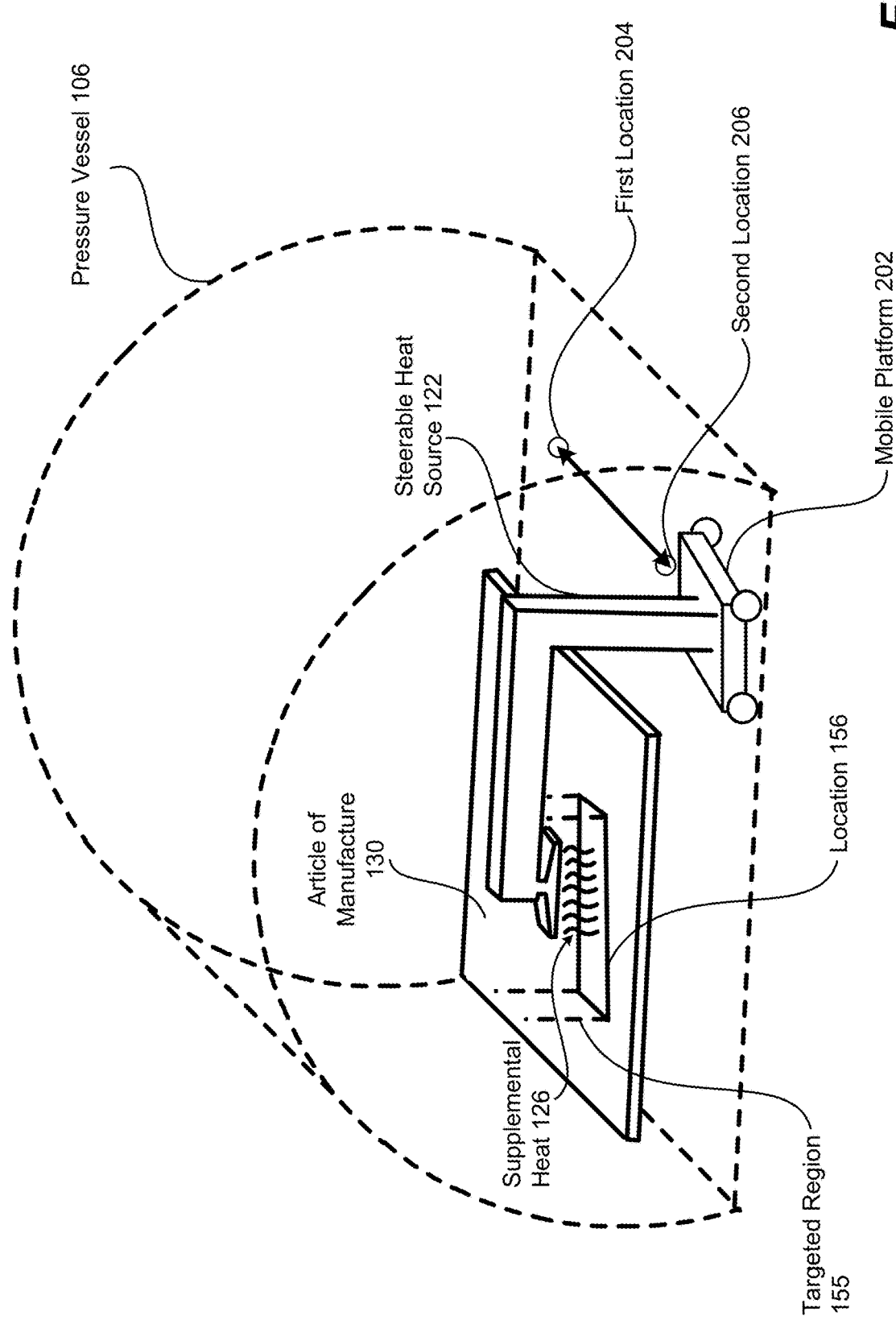
FIG. 2 is a diagram of a pressure vessel that includes components operable to direct supplemental heat toward a targeted region.

FIG. 2 is an illustrative example of a pressure vessel 106 configured to receive an article of manufacture 130. In the example illustrated in FIG. 2, the steerable heat source 122 is coupled to a mobile platform 202. The mobile platform 202 is configured to move within the pressure vessel 106 based on commands from the control system 114 (shown in FIG. 1). To illustrate, the mobile platform 202 can move from a first location 204 in the pressure vessel 106 to a second location 206 in the pressure vessel 106 based on commands that indicate to move the mobile platform 202 between the locations 204, 206. The steerable heat source 122 moves in conjunction with the mobile platform 202 because the steerable heat source 122 is coupled to the mobile platform 202. Thus, the steerable heat source 122 can move within the pressure vessel 106 based on commands generated by the control system 114.

According to one implementation, the cure recipe 132 (shown in FIG. 1) specifies the location 156 on the article of manufacture 130 to provide supplemental heat 126. In one example, the location 156 specified by the cure recipe 132 can correspond to a particular area that requires additional heat to reduce thermal expansions that may otherwise be experienced by the article of manufacture 130. The control system 114 is configured to control the movement of the mobile platform 202 and the steerable heat source 122 based on the cure recipe 132. The control system 114 can identify a targeted region 155 within the pressure vessel 106 that corresponds to the location 156 on the article of manufacture 130. The targeted region 155 can be identified based on dimensions of the article of manufacture 130 defined by the cure recipe 132 and the location and orientation of the article of manufacture 130 within the pressure vessel 106. In response to identifying the targeted region 155, the control system 114 generates a command to steer the steerable heat source 122 toward the targeted region 155 to provide the supplemental heat 126 at the location 156 on the article of manufacture 130. In the example of FIG. 2, the mobile platform 202 includes wheels, tracks, or slides, or other motive devices to move the steerable heat source 122 from the first location 204 to the second location 206 to enable the steerable heat source 122 to provide the supplemental heat 126 at the location 156 on the article of manufacture 130.

The techniques described with respect to FIG. 2 enable directing the supplemental heat 126 to specified portions (e.g., the location 156) of the article of manufacture 130 to facilitate heating control across composite panels (e.g., the article of manufacture 130) while curing inside the pressure vessel 106. For example, based on the cure recipe 132, the mobile platform 202 and the steerable heat source 122 can be steered (by commands from the control system 114) to provide the supplemental heat 126 at the location 156 on the article of manufacture 130. Providing the supplemental heat 126 at the targeted location 156 can reduce the cycle time for curing the article of manufacture 130. Additionally, articles of manufacture 130 having complex (e.g., non-uniform) heating requirements can be cured by applying the supplemental heat 126 to designated sections.

Additionally, the techniques described with respect to FIG. 2 can reduce thermal expansion differences across the article of manufacture 130 that results from temperature differentials experienced by different portions of the article of manufacture 130. For example, the mobile platform 202 and the steerable heat source 122 can be steered (by commands from the control system 114) towards the cooler locations to provide the supplemental heat 126. As a result, process induces stresses in the article of manufacture 130 (e.g., due to different curing rates or differential thermal expansion) can be substantially reduced.

Figure 3:
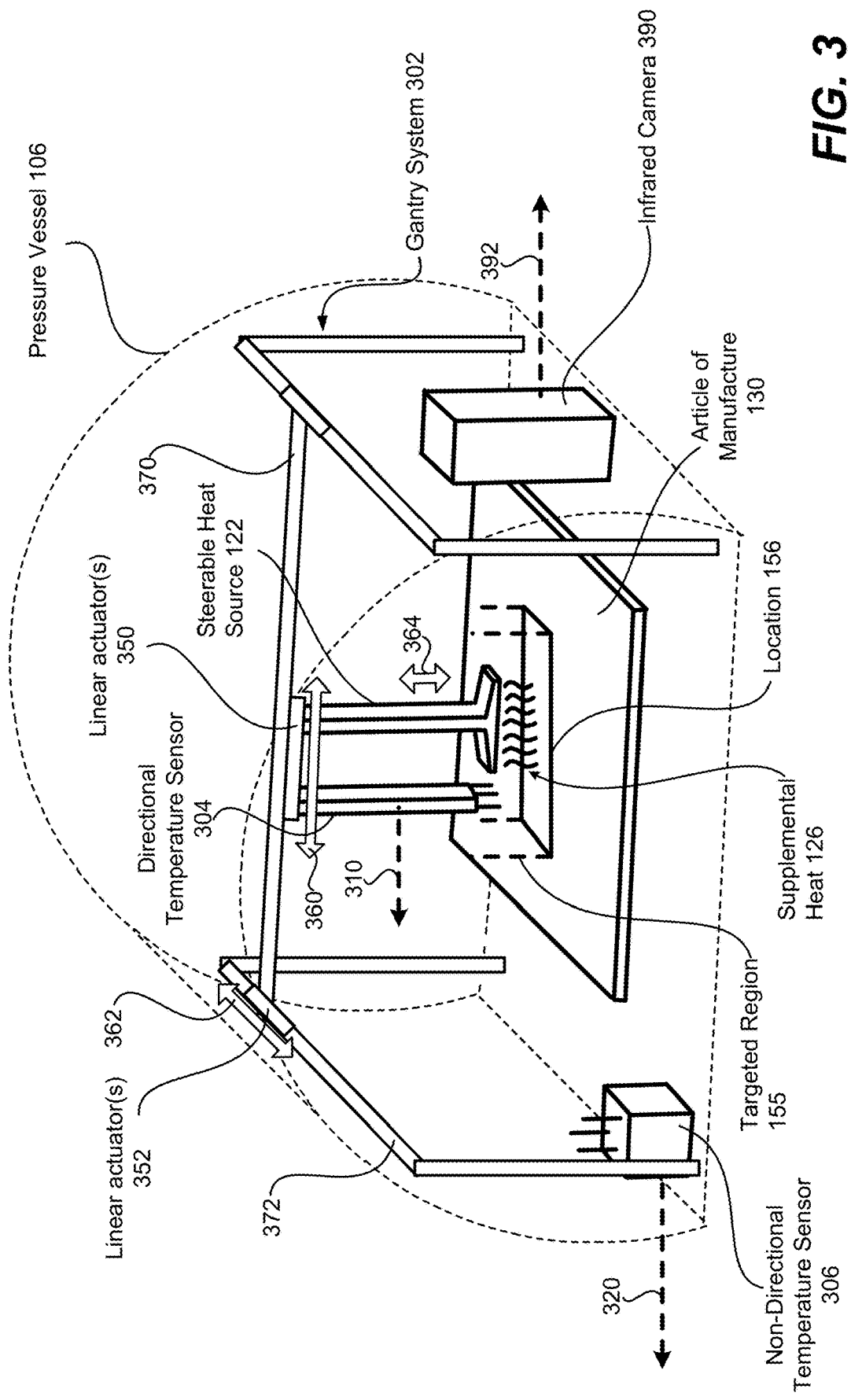
FIG. 3 is another diagram of a pressure vessel that includes components operable to direct supplemental heat toward a targeted region.

FIG. 3 is another illustrative example of a pressure vessel 106 configured to receive an article of manufacture 130. In the example illustrated in FIG. 3, the steerable heat source 122 is coupled to a gantry system 302 that is disposed within the pressure vessel 106.

The gantry system 302 is configured to move the steerable heat source 122 within the pressure vessel 106 using one or more linear actuators 350, 352. For example, a linear actuator(s) 350 is coupled to move along a first railing 370 of the gantry system 302. Based on commands from the control system 114 (shown in FIG. 1), the linear actuator(s) 350 is configured to move the steerable heat source 122 along the first railing 370 in a first direction 360. A linear actuator(s) 352 is couple to move along a second railing 372 of the gantry system 302, and the first railing 370 is coupled to the linear actuator(s) 352. Based on commands from the control system 114, the linear actuator(s) 352 is configured to move the first railing 370, and thus the steerable heat source 122, along the second railing 372 in a second direction 362. Additionally, based on commands from the control system 114, steerable heat source 122 can be raised or lowered according to a third direction 364.

According to one implementation, the cure recipe 132 (shown in FIG. 1 specifies the location 156 on the article of manufacture 130 to provide supplemental heat 126. In one example, the location 156 specified by the cure recipe 132 can correspond to a particular area that requires additional heat to reduce thermal expansions that may otherwise be experienced by the article of manufacture 130. The control system 114 is configured to control the movement of the gantry system 302 and the steerable heat source 122 based on the cure recipe 132. The control system 114 can identify the targeted region 155 within the pressure vessel 106 that corresponds to the location 156 on the article of manufacture 130. The targeted region 155 can be identified based on dimensions of the article of manufacture 130 defined by the cure recipe 132 and the location and orientation of the article of manufacture 130 within the pressure vessel 106. In response to identifying the targeted region 155, the control system 114 generates a command to move the railings 370, 372 of gantry system 302 (via the linear actuators 350, 352) and the steerable heat source 122 toward the targeted region 155 to provide the supplemental heat 126 at the location 156 on the article of manufacture 130.

According to one implementation, a directional temperature sensor 304 is coupled to the gantry system 302. The directional temperature sensor 304 can include an infrared temperature sensor. In FIG. 3, the directional temperature sensor 304 is coupled to the linear actuator(s) 350 and is configured to move within the pressure vessel 106 in a similar manner as the steerable heat source 122. The directional temperature sensor 304 is configured to measure a temperature of the targeted region 155 and to generate a first temperature feedback signal 310 that indicates the measured temperature of the targeted region 155. The first temperature feedback signal 310 is provided to the control system 114. Based on the measured temperature, the control system 114 can move the railings 370, 372 of the gantry system 302 (via the linear actuators 350, 352) and the steerable heat source 122 toward the targeted region 155. For example, if the first temperature feedback signal 310 indicates that the temperature of the targeted region 155 is below a temperature indicated in the cure recipe 132, the control system 114 can command the linear actuators 350, 352 and the steerable heat source 122 to move toward the targeted region 155 to provide the supplemental heat 126 at the location 156 on the article of manufacture 130. The control system 114 can use positional sensors and encoders to drive and control the linear actuators 350, 352.

According to one implementation, a non-directional temperature sensor 306 is disposed within the pressure vessel 106. The non-directional temperature sensor 306 can include a thermocouple, a thermistor, etc. The non-directional temperature sensor 306 is configured to measure a temperature of the interior of the pressure vessel 106 and to generate a second temperature feedback signal 320 that indicates the measured temperature of the interior of the pressure vessel 106. The non-directional temperature sensor 306 provides the second temperature feedback signal 320 to the control system 114. Based on the second temperature feedback signal 320, the control system 114 can command the wide-area heat source 120 to adjust the temperature of the interior of the pressure vessel 106. For example, the control system can activate one or more additional resistive elements of the wide-area heat source 120.

According to one implementation, an infrared camera 390 is disposed within the pressure vessel 106. The infrared camera 390 is configured to monitor temperatures of different regions within the pressure vessel 106. For example, the infrared camera 390 can detect locations of one or more cooler regions within the pressure vessel 106 and can generate a feedback signal 392 indicating the locations of the one or more cooler regions, such as the location of the targeted region 155. Based on the feedback signal 392, the control system 114 can move the railings 370, 372 of the gantry system 302 (via the linear actuators 350, 352) and the steerable heat source 122 toward the targeted region 155. For example, if the first temperature feedback signal 310 indicates that the temperature of the targeted region 155 is below a temperature indicated in the cure recipe 132, the control system 114 can command the linear actuators 350, 352 and the steerable heat source 122 to move toward the targeted region 155 to provide the supplemental heat 126 at the location 156 on the article of manufacture 130. The control system 114 can use positional sensors and encoders to drive and control the linear actuators 350, 352.

Although the directional temperature sensor 304 and the non-directional temperature sensor 306 are depicted in FIG. 3, it should be noted that the directional temperature sensor 304 and the non-directional temperature sensor 306 can be integrated into other examples of pressure vessel 106. For example, the temperature sensors 304, 306 can be integrated into the pressure vessel 106 illustrated in FIGS. 1, 2, and 4.

The techniques described with respect to FIG. 3 enable directing the supplemental heat 126 to specified portions (e.g., the location 156) of the article of manufacture 130 to facilitate heating control across composite panels (e.g., the article of manufacture 130) while curing inside the pressure vessel 106. For example, based on the cure recipe 132, the railings 370, 372 of the gantry system 302 and the steerable heat source 122 can be steered (by commands from the control system 114) to provide the supplemental heat 126 at the location 156 on the article of manufacture 130. Providing the supplemental heat 126 at the targeted location 156 can reduce the cycle time for curing the article of manufacture 130. Additionally, articles of manufacture 130 having complex (e.g., non-uniform) heating requirements can be cured by applying the supplemental heat 126 to designated sections.

Additionally, the techniques described with respect to FIG. 3 can reduce thermal expansion differences across the article of manufacture 130 that results from temperature differentials experienced by different portions of the article of manufacture 130. For example, the railings 370, 372 of the gantry system 302 and the steerable heat source 122 can be steered (by commands from the control system 114) towards the cooler locations to provide the supplemental heat 126. As a result, process induces stresses in the article of manufacture 130 (e.g., due to different curing rates or differential thermal expansion) can be substantially reduced.

Figure 4:
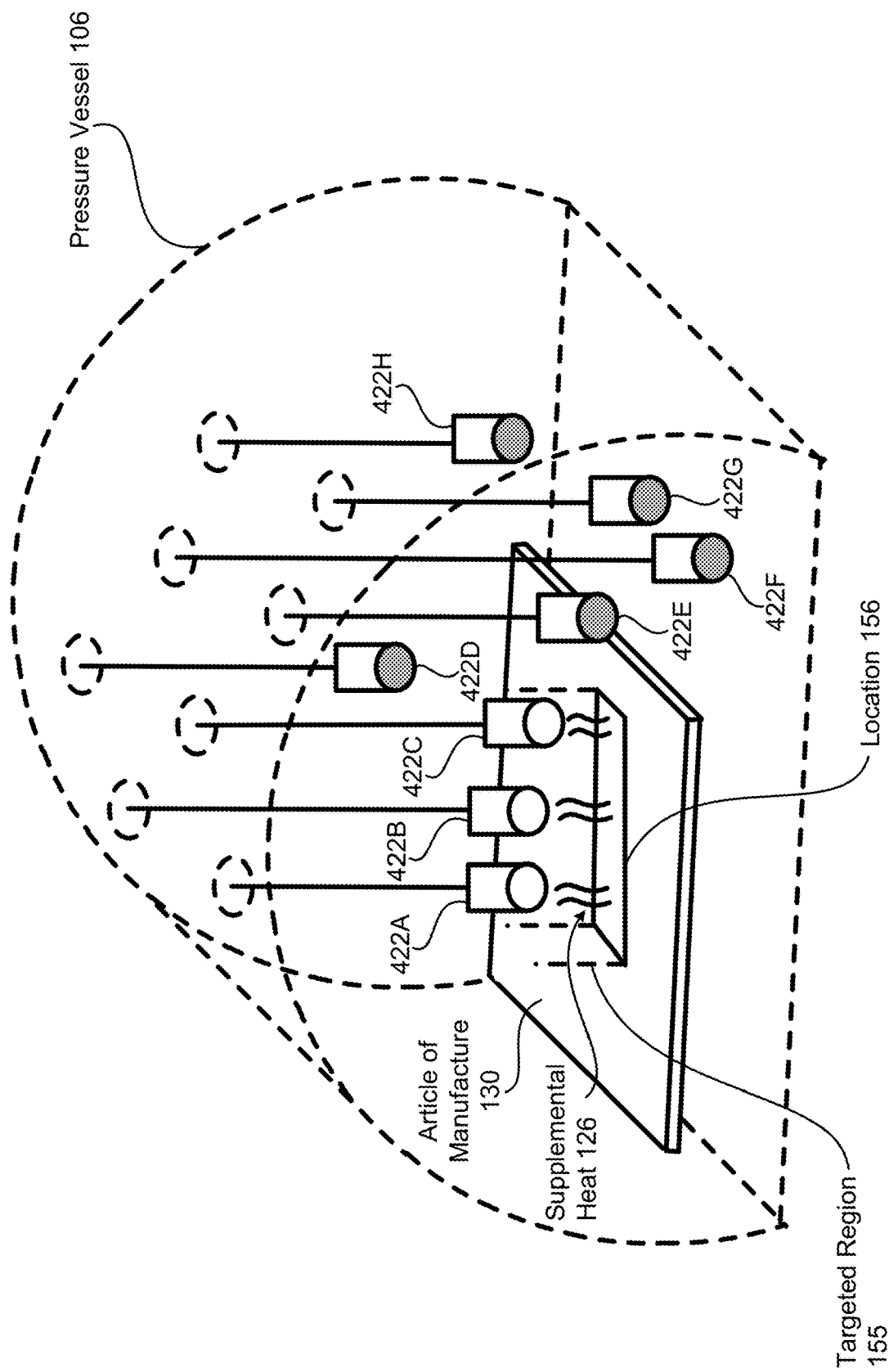
FIG. 4 is another diagram of a pressure vessel that includes components operable to direct supplemental heat toward a targeted region.

FIG. 4 is another illustrative example of a pressure vessel 106 configured to receive an article of manufacture 130. In the example illustrated in FIG. 4, a plurality of light sources 422 are arranged in a pattern within the pressure vessel 106. The plurality of light sources 422 can correspond to the steerable heat source 122 of FIG. 1. Upon activation, each light source 422 is configured to provide supplemental heat 126 to a corresponding region within the pressure vessel 106. To illustrate, the plurality of lights sources 422 includes a light source 422A, a light source 422B, a light source 422C, a light source 422D, a light source 422E, a light source 422F, a light source 422G, and a light source 422H. In FIG. 4, the light sources 422A-422C are activated, and the light sources 422D-422H are deactivated. As a result, the light sources 422A-422C provide the supplemental heat 126 to regions that are proximate to the light sources 422A-422C. Although eight light sources 422 are illustrated in FIG. 4, in other implementations, additional (or fewer) light sources can be arranged within the pressure vessel 106. As a non-limiting example, fifteen (15) light sources can be arranged within the pressure vessel 106. Additionally, the light sources 422 can be disposed with the pressure vessel 106 in different ways. For example, although the light sources 422 are depicted as hanging from a wall or ceiling of the pressure vessel 106, in other implementations, the light sources 422 can be standalone light sources pointed towards different locations in the pressure vessel 106, door-mounted light sources pointed towards different locations in the pressure vessel 106, floor-mounted light sources pointed towards different locations, etc.

According to one implementation, the cure recipe 132 (shown in FIG. 1) specifies the location 156 on the article of manufacture 130 to provide supplemental heat 126. In one example, the location 156 specified by the cure recipe 132 can correspond to a particular area that requires additional heat to reduce thermal expansions that may otherwise be experienced by the article of manufacture 130. The control system 114 is configured to selectively activate a subset of the plurality of light sources 422 based on the cure recipe 132. For example, the control system 114 can identify the targeted region 155 within the pressure vessel 106 that corresponds to the location 156 on the article of manufacture 130. The targeted region 155 can be identified based on dimensions of the article of manufacture 130 defined by the cure recipe 132 and the location and orientation of the article of manufacture 130 within the pressure vessel 106. In response to identifying the targeted region 155, the control system 114 generates a command to activate the light sources 422A, 422B, 422C that are proximate to the targeted region 155 to provide the supplemental heat 126 at the location 156 on the article of manufacture 130.

The techniques described with respect to FIG. 4 enable directing the supplemental heat 126 to specified portions (e.g., the location 156) of the article of manufacture 130 to facilitate heating control across composite panels (e.g., the article of manufacture 130) while curing inside the pressure vessel 106. For example, based on the cure recipe 132, the subset of light sources 422A-422C can be activated (by commands from the control system 114) to provide the supplemental heat 126 at the location 156 on the article of manufacture 130. Providing the supplemental heat 126 at the targeted location 156 can reduce the cycle time for curing the article of manufacture 130. Additionally, articles of manufacture 130 having complex (e.g., non-uniform) heating requirements can be cured by applying the supplemental heat 126 to designated sections.

Additionally, the techniques described with respect to FIG. 4 can reduce thermal expansion differences across the article of manufacture 130 that results from temperature differentials experienced by different portions of the article of manufacture 130. For example, the light sources 422A-422C proximate to the cooler locations can be activated to provide the supplemental heat 126. As a result, process induces stresses in the article of manufacture 130 (e.g., due to different curing rates or differential thermal expansion) can be substantially reduced.

FIG. 5 is another illustrative example of a pressure vessel 106 configured to receive an article of manufacture 130. In the example illustrated in FIG. 5, a fixed, supplemental, zonal, and grid-controllable heat source (herein referred to as a "supplemental heat source 522") is disposed within the pressure vessel 106. The supplemental heat source 522 can be used in addition to, or in lieu of, the steerable heat source 122. According to one implementation, the supplemental heat source 522 can be an example of a steerable heat source. For example, different grids of the supplemental heat source 522 can be activated to "steer" heat towards corresponding regions of the pressure vessel 106.

To illustrate, the control system 114 is configured to selectively activate different grids of the supplemental heat source 522 based on the cure recipe 132. For example, the control system 114 can identify the targeted region 155 within the pressure vessel 106 that corresponds to the location 156 on the article of manufacture 130. The targeted region 155 can be identified based on dimensions of the article of manufacture 130 defined by the cure recipe 132 and the location and orientation of the article of manufacture 130 within the pressure vessel 106. In response to identifying the targeted region 155, the control system 114 generates a command to activate the grids of the supplemental heat source 522 that are proximate to the targeted region 155 to provide the supplemental heat 126 at the location 156 on the article of manufacture 130.

The techniques described with respect to FIG. 5 enable directing the supplemental heat 126 to specified portions (e.g., the location 156) of the article of manufacture 130 to facilitate heating control across composite panels (e.g., the article of manufacture 130) while curing inside the pressure vessel 106. For example, based on the cure recipe 132, select grids of the supplemental heat source 522 can be activated to provide the supplemental heat 126 at the location 156 on the article of manufacture 130. Providing the supplemental heat 126 at the targeted location 156 can reduce the cycle time for curing the article of manufacture 130.

Figure 6:
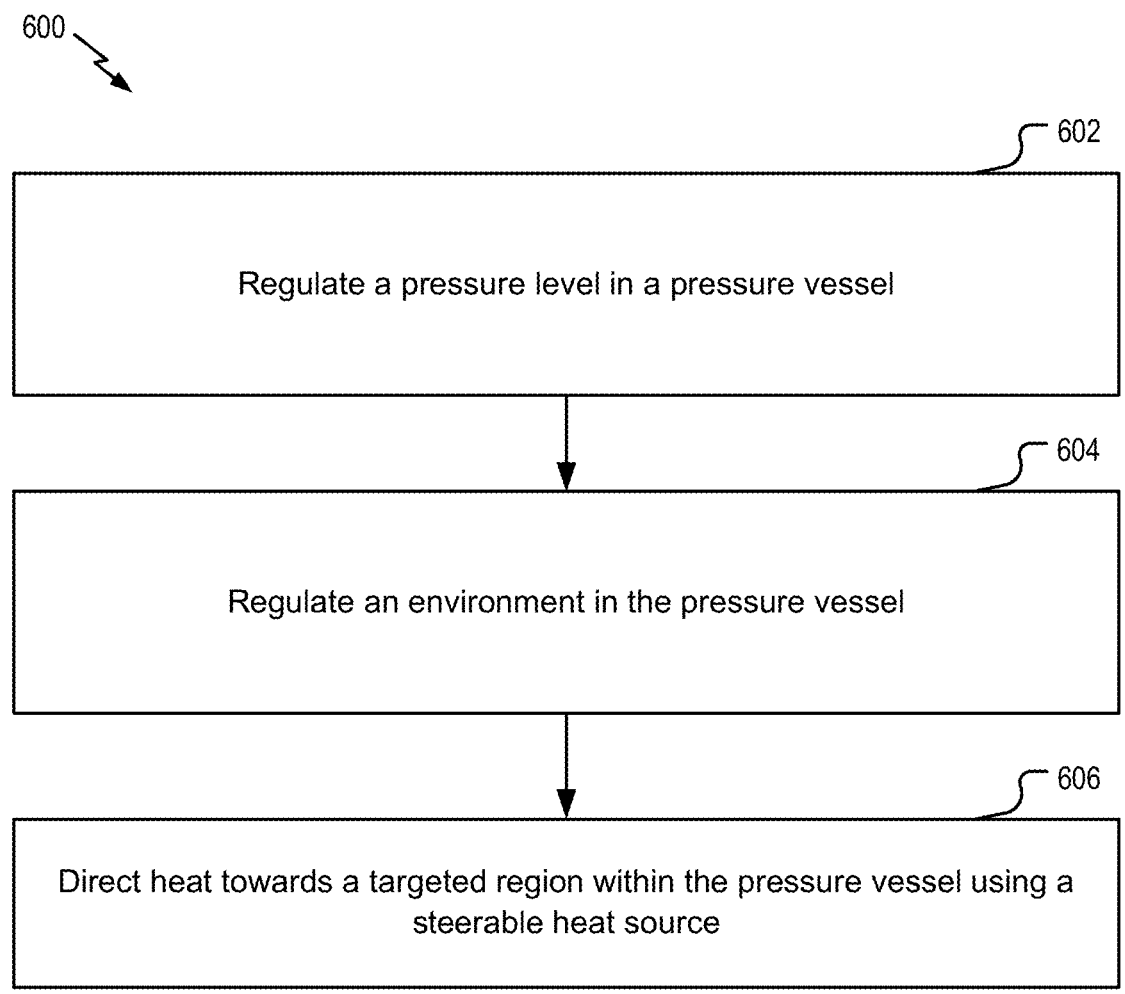
FIG. 6 is a flowchart of a method of heat and pressure treating an article of manufacture.

FIG. 6 is a flowchart of a method 600 of heat and pressure treating an article of manufacture is shown. In an illustrative example, the method 400 is performed by the system 100 of FIG. 1 or at least one of the components thereof, the pressure vessel 106 illustrated in FIG. 2 or at least one of the components thereof, the pressure vessel 106 illustrated in FIG. 3 or at least one of the components thereof, the pressure vessel 106 illustrated in FIG. 4 or at least one of the components thereof, or a combination thereof.

The method 600 includes regulating a pressure level in a pressure vessel, at 602. For example, to regulate the pressure of the interior of the pressure vessel 106, the control system 114 can receive a pressure reading from the pressure sensor(s) 110 coupled to the autoclave 102. The pressure sensor(s) 110 indicates the pressure level of the interior of the pressure vessel 106. If the cure recipe 132 indicates that a target pressure for the interior of the pressure vessel 106 is fifteen (15) psi and the pressure sensor(s) 110 indicates that the pressure level of the interior of the pressure vessel 106 is thirteen (13) psi, the control system 114 can regulate (e.g., increase) the pressure level of the interior of the pressure vessel 106 using the compressor 112 coupled to the pressure vessel 106. For example, the control system 114 can generate a command to activate the compressor 112 to increase the pressure level of the interior of the pressure vessel 106.

The method 600 also includes regulating an environment in the pressure vessel, at 604. For example, to regulate the pressure of the interior of the pressure vessel 106, the control system 114 can generate a command to activate the compressor 112 to increase the pressure level of the interior of the pressure vessel 106. Additionally, or in the alternative, the control system 114 can regulate the temperature in the pressure vessel 106 using the wide-area heat source 120. To illustrate, the temperature sensor(s) 108 or the non-directional temperature sensor 306 can detect the temperature of the interior of the pressure vessel 106 and can provide a temperature signal, such as the second temperature feedback signal 320, to the control system 114. Based on the temperature signal, the control system 114 can regulate (e.g., increase or decrease) the temperature of the interior of the pressure vessel 106 using the wide-area heat source 120. To illustrate, if the temperature signal indicates that the temperature of the interior of the pressure vessel 106 is two-hundred four (204) degrees Celsius and a target temperature (indicated by the cure recipe 132) for the interior of the pressure vessel 106 is three-hundred (300) degrees Celsius, the control system 114 can generate a command to increase heat output by the wide-area heat source 120 to increase the temperature of the interior of the pressure vessel 106.

The method 600 also includes directing heat towards a targeted region within the pressure vessel using a steerable heat source, at 606. For example, the cure recipe 132 can specifies the location 156 on the article of manufacture 130 to provide the supplemental heat 126. The control system 114 controls the steerable heat source 122 based on the cure recipe 132. For example, the control system 114 can identify the targeted region 155 within the pressure vessel 106 that corresponds to the location 156 on the article of manufacture 130. In response to identifying the targeted region 155, the control system 114 generates the command to steer the steerable heat source 122 toward the targeted region 155 to provide the supplemental heat 126 at the location 156 on the article of manufacture 130.

The method 600 of FIG. 6 enables directing the supplemental heat 126 to specified portions (e.g., the location 156) of the article of manufacture 130 to facilitate heating control across composite panels (e.g., the article of manufacture 130) while curing inside the autoclave 102. For example, based on the cure recipe 132, the control system 114 can identify at least one location 156 on the article of manufacture 130 that is to be provided supplemental heat 126 in addition to the heat 124 provided by the wide-area heat source 120. In response to identifying the location 156, the control system 114 can steer the steerable heat source 122 to provide the supplemental heat 126 at the location 156 on the article of manufacture 130. Providing the supplemental heat 126 at the targeted location 156 can reduce the cycle time for curing the article of manufacture 130. Additionally, articles of manufacture 130 having complex (e.g., non-uniform) heating requirements can be cured by applying the supplemental heat 126 to designated sections.

Additionally, the system method 600 can reduce thermal expansion differences across the article of manufacture 130 that results from temperature differentials experienced by different portions of the article of manufacture 130. For example, the control system 114 can use temperature data from the temperature sensor(s) 108 to identify locations, such as the location 156, on the article of manufacture 130 that are cooler than other locations. In response to identifying the cooler locations, the control system 114 can steer the steerable heat source 122 towards the cooler locations (based on position feedback information from the position sensor(s) 190) to provide the supplemental heat 126. As a result, process induces stresses in the article of manufacture 130 (e.g., due to different curing rates or differential thermal expansion) can be substantially reduced.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An apparatus comprising:
   a pressure vessel;
   a steerable heat source disposed within the pressure vessel, wherein the steerable heat source comprises a first actuator configured to steer the steerable heat source along a first axis within the pressure vessel via a first railing, and wherein a second actuator is configured to steer the steerable heat source along a second axis within the pressure vessel via a second railing, and wherein the first axis is non-parallel with the second axis; and one or more control systems coupled to the steerable heat source, the one or more control systems configured to direct supplemental heat toward a targeted region within the pressure vessel using the steerable heat source.

2. The apparatus of claim 1, further comprising a wide-area heat source disposed within the pressure vessel, wherein the one or more control systems are configured to regulate a temperature of an interior of the pressure vessel using the wide-area heat source.

3. The apparatus of claim 1, further comprising a compressor to control a pressure level in the pressure vessel, the compressor coupled to the one or more control systems.

4. The apparatus of claim 1, further comprising a gantry system to move the steerable heat source towards the targeted region, wherein the gantry system comprises the first railing and the second railing.

5. The apparatus of claim 4, further comprising at least one directional temperature sensor to provide a first temperature feedback signal for the targeted region to the one or more control systems, the at least one directional temperature sensor coupled to the gantry system.

6. The apparatus of claim 5, further comprising at least one non-directional temperature sensor to provide a second temperature feedback signal for an interior of the pressure vessel to the one or more control systems, the at least one non-directional temperature sensor coupled to the one or more control systems.

7. The apparatus of claim 1, further comprising an infrared camera to provide a feedback signal for the targeted region to the one or more control systems.

8. The apparatus of claim 1, wherein an interior of the pressure vessel is configured to receive an article of manufacture, and wherein, based on a cure recipe associated with the article of manufacture, the one or more control systems is further configured to:

regulate a temperature of the interior of the pressure vessel; and regulate a pressure of the interior of the of the pressure vessel.

9. The apparatus of claim 8, wherein the cure recipe specifies a location on the article of manufacture to provide the supplemental heat, and wherein the one or more control systems is configured to control the steerable heat source based on the cure recipe.

10. The apparatus of claim 8, wherein the cure recipe specifies a uniform interior temperature for a substrate of the article of manufacture, and wherein based on a detected non-uniform interior temperature within the substrate, the one or more control systems is configured to control the steerable heat source.

11. The apparatus of claim 1, further comprising a fixed, supplemental, zonal, and grid-controllable heat source.

12. The apparatus of claim 1, wherein the steerable heat source comprises a light-based heat source.

13. The apparatus of claim 12, wherein the light-based heat source comprises a laser, an infrared radiation device, a conductive heat device, an inductive heat device, or a resistive heat device.

14. The apparatus of claim 5, wherein the at least one directional temperature sensor is coupled to the first actuator or the second actuator.

15. The apparatus of claim 7, wherein the one or more control systems are configured to identify the targeted region based on a cooler region identified by the infrared camera.

16. A method of heat and pressure treating an article of manufacture, the method comprising:

regulating a pressure level in a pressure vessel;

regulating an environment of the pressure vessel; and directing heat towards a targeted region within the pressure vessel using a steerable heat source by steering the steerable heat source, wherein the steerable heat source is steerable via an actuator configured to move a mobile platform within the pressure vessel.

17. The method of claim 16, wherein directing the heat towards the targeted region comprises selectively activating a subset of a plurality of light sources within the pressure vessel, and wherein the steerable heat source comprises the plurality of light sources.

18. The method of claim 16, wherein the steerable heat source is directed to the targeted region based on a cure recipe identifying the targeted region.

19. An apparatus comprising:

a pressure vessel having an interior that is configured to receive an article of manufacture;

a wide-area heat source disposed within the pressure vessel;

a steerable heat source disposed within the pressure vessel, wherein the steerable heat source comprises an actuator configured to steer the steerable heat source by moving a mobile platform within the pressure vessel;

a compressor coupled to the pressure vessel; and one or more control systems coupled to the wide-area heat source, to the steerable heat source, and to the compressor, wherein, based on a cure recipe associated with the article of manufacture, the one or more control systems is configured to:

regulate a temperature of the interior of the pressure vessel using the wide-area heat source;

direct supplemental heat toward a targeted region within the pressure vessel using the steerable heat source; and regulate a pressure level of the interior of the pressure vessel using the compressor.

20. The apparatus of claim 19, wherein the mobile platform includes wheels, tracks, or slides.

* * * * *